United States Patent [19]
Matsumoto et al.

[11] Patent Number: 5,889,907
[45] Date of Patent: Mar. 30, 1999

[54] OPTICAL PROCESSING METHOD USING FINE LIQUID CRYSTAL DROPLETS AND WAVEGUIDE TYPE OPTICAL DEVICE FOR OPTICAL PROCESSING

[75] Inventors: Shiro Matsumoto, Ageo; Takayoshi Hayashi, Kodaira; Ken-ichi Kubodera, Sayama, all of Japan

[73] Assignee: Nippon Telegraph and Telephone Corporation, Tokyo, Japan

[21] Appl. No.: 704,374

[22] Filed: Aug. 28, 1996

[30] Foreign Application Priority Data

Sep. 8, 1995 [JP] Japan .................................. 7-231300
Feb. 9, 1996 [JP] Japan .................................. 8-024418

[51] Int. Cl.$^6$ .................................. G02B 6/26; G02F 1/13
[52] U.S. Cl. .................................. 385/40; 252/299.01; 349/91; 349/193; 385/8; 385/142
[58] Field of Search .................................. 349/86, 88, 89, 349/91, 193, 194, 196, 197; 385/8, 9, 11, 15, 40, 41, 141–143; 252/299.01, 299.4, 299.5, 299.6

[56] References Cited

U.S. PATENT DOCUMENTS

| 5,084,203 | 1/1992 | Sansone et al. | 252/299.5 |
| 5,353,133 | 10/1994 | Bernkopf | 349/86 X |
| 5,537,242 | 7/1996 | Lim | 359/287 |

OTHER PUBLICATIONS

A.J. Ticknor et al.,"Practical Considerations for Polymer Photonic Devices" *SPIE* vol. 2285, 0–8194–1609–Jun. 1994, USA, pp. 386–391.
*Merck Liquid Crystals*, Dr. D. Coates, An Introduction to Polymer Dispersed Liquid Crystals, Version 2, Issued Aug. 1994, USA, pp. 5–11.
John L. West, "Phase Separtion of Liquid Crystals in Polymers", *Mol. Cryst. Liq. Cryst. Inc. Nonlin. Opt.*, 1988 [No Month], vol. 157, pp. 427–441, USA.

A.M. Lackner et al., "Droplet size control in Polymer Dispersed Liquid Crystal Films", *SPIE* vol. 1080 Liquid Crystal Chemical, Physics, and Application, 1989 [No Month], USA, pp. 53–61.

Japan (Extended Abstracts), *The 5th Symposium on Intelligent Materials & The UK–Japan Seminar on Intelligent Materials,* Mar. 21–22, 1996, Shiro Matsumoto et al Transparent Optical Polymers Containing Fine Particles of Liquid Crystals, pp. 73–75.

(List continued on next page.)

*Primary Examiner*—John D. Lee
*Attorney, Agent, or Firm*—Venable; Robert J. Frank; Allen Wood

[57] ABSTRACT

Two optical waveguides comprising a light transmitting medium are disposed close to each other on a substrate, and electrodes are disposed parallel to each other so as to sandwich one optical waveguide. The light transmitting medium is formed by dispersing fine droplets of a liquid crystal in a light transmitting material, such as glass or polymer, the liquid crystal fine droplets having droplet diameters of about one digit smaller (that is, about an order of magnitude smaller) than the wavelength of light. Linearly polarized light having a plane of polarization in a direction parallel to the direction of application of voltage to the optical waveguide, i.e., in the direction of the substrate surface, is fed as input lights into the optical waveguides. Upon application of voltage, the refractive index of one optical waveguide changes, while the refractive index of the other optical waveguide remains unchanged. Hence, the coupling ratio changes, achieving an optical switch. Thus, the present invention can provide a practical optical processing method which utilizes the large refractive index anisotropy and the low-voltage response of a liquid crystal, and a waveguide type optical device which can be used preferably for this method.

9 Claims, 7 Drawing Sheets

OTHER PUBLICATIONS

*Polymer Preprints,* Japan, vol. 45, No. 3, May 1996, The Society of Polymer Science, Japan, English translation, Shiro Matsumoto et al. "Preparation of LC Fine Particles in Polymer".

Shiro Matsumoto et al., "Fine droplets of liquid crystals in a transparent polymer and their response to an electric field", *Appl. Phys. Lett.,* vol. 69, No. 8, Aug. 19, 1996, 0003–6951/96/69(8)/1044/3, ©1996 American Institute of Physics, pp. 1044–1046.

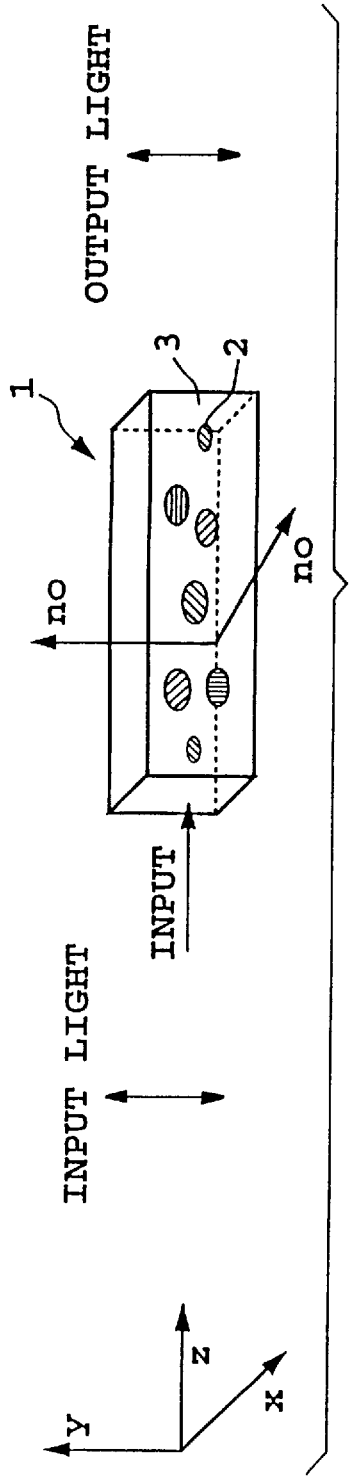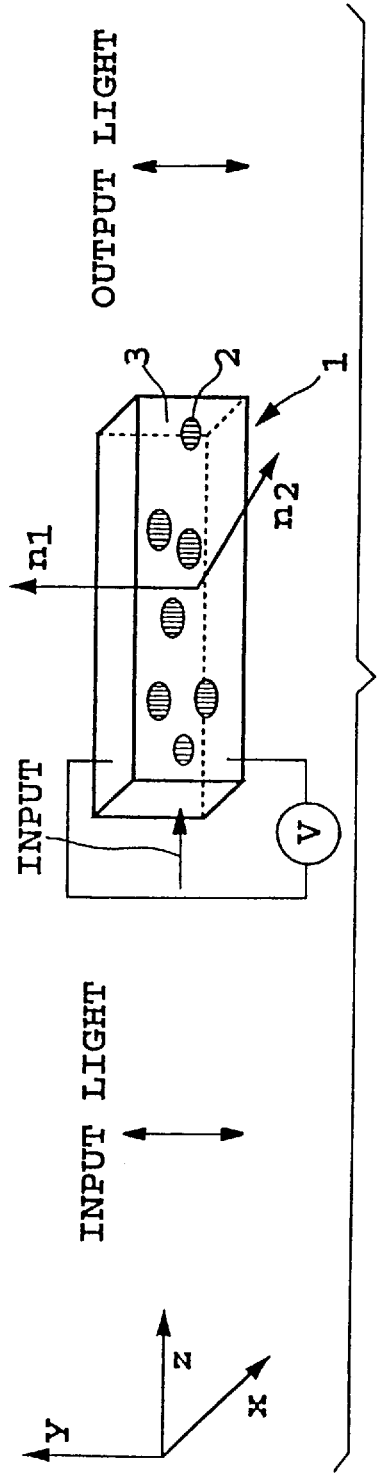

OPTICAL PROCESSING METHOD USING FINE LIQUID CRYSTAL DROPLETS AND WAVEGUIDE TYPE OPTICAL DEVICE FOR OPTICAL PROCESSING

BACKGROUND OF THE INVENTION

1. Field of the Invention

The present invention relates to an optical processing method usable preferably in the fields of optical communication systems and optical information processing, and a waveguide type optical device for optical processing that can be used preferably in this method.

2. Description of the Prior Art

The main practical methods known for optical processing are mechanical methods, and methods which rely on the phenomenon that the refractive index of a light transmitting medium changes when non-mechanical energy such as voltage, electric current or heat is applied to the light transmitting medium. Currently, the former methods are put to practical use. Of the latter methods, the most feasible one uses the electro-optical effect of lithium niobate (Pockels effect, an effect in which the birefringence characteristics of the material change according to an electric field). Recently, devices using the electro-optical effect of dye attached polymers, which are much more processable and much less expensive than lithium niobate have been developed (A. J. Ticknor, G. F. Lipscomb, and R. Lytel, Proc. SPIE Vol 2285, 386 (1995). These devices have posed the problem of long-term stability. With such devices, the use of materials undergoing great changes in the refractive index at low voltage is advantageous for low voltage driving as well as for the realization of miniaturized high density devices. The magnitude of a change in the refractive index of lithium niobate per unit voltage is an index to evaluating the feasibility of the material.

A method using the refractive index anisotropy of a liquid crystal is also known for optical processing, which method utilizes changes in the refractive index by application of voltage. The use of liquid crystal produces only a slow response (several tens of microseconds to several milliseconds) compared with a response obtained by use of the Pockels effect of lithium niobate or the like (nanoseconds). Liquid crystal, however, is advantageous in that it generally undergoes a large change in the refractive index when voltage is applied. Optical devices taking this advantage, such as optical switches, have also been developed. Most of them are vertical type devices, and waveguide type optical devices have been minimally studied. The reason why a practical waveguide type optical device using a liquid crystal has not been developed is that a liquid crystal is subject to regular or irregular deformations or fluctuations in the orientation vector that occur on the scale of about the wavelength of light. This causes scattering of light, and a great optical transmission loss. Another reason is the fluidity and poor processability of liquid crystal.

SUMMARY OF THE INVENTION

This invention aims to solve the problem of optical transmission loss, and to provide a practical optical processing method which utilizes the high refractive index anisotropy and low-voltage response of a liquid crystal, and a waveguide type optical device for optical processing which can be used preferably in this optical processing method.

To attain the foregoing goals, the optical processing method of the present invention comprises applying voltage to a light transmitting medium perpendicularly to a direction in which light is transmitted, the light transmitting medium having dispersed therein fine droplets of a liquid crystal having droplet diameters of about one digit smaller (that is, about an order of magnitude smaller) than the wavelength of light to be processed, thereby causing refractive index anisotropy in a plane parallel to an electric field generated in the medium by the voltage, to process light which has been fed into the medium perpendicularly to the plane having the refractive index anisotropy.

The diameters of the liquid crystal fine droplets may be 50 nm or less. As the input light, there may be used linearly polarized light having a plane of polarization making an angle of 45° with the direction of application of voltage so that the form of polarization of the output light will be processed. Alternatively, the input light may be linearly polarized light having a plane of polarization making an angle of 0° or 90° with the direction of application of voltage so that the phase of linear polarization of the output light will be processed. Further alternatively, the input light may be linearly polarized light having a plurality of wavelengths and having a plane of polarization making an angle of 45° with the direction of application of voltage so that the form of polarization of the output light will be processed to separate the light with a plurality of wavelengths.

The waveguide type optical device for light processing in accordance with the present invention comprises a light transmitting medium formed by dispersing fine droplets of a liquid crystal in a medium, the fine droplets of the liquid crystal having droplet diameters of about one digit smaller than the wavelength of light for communication, and the medium being a material optically transparent in the infrared region used in optical communication.

The diameters of the liquid crystal fine droplets may be 50 nm or less. The optically transparent material may be a photopolymerization polymer, and the liquid crystal may be a nematic liquid crystal. The liquid crystal optical device may further comprise a voltage application means for applying voltage to the light transmitting medium perpendicularly to a direction in which light is transmitted.

The above and other objects, effects, features and advantages of the present invention will become more apparent from the following description of embodiments thereof taken in conjunction with the accompanying drawings.

BRIEF DESCRIPTION OF THE DRAWINGS

FIGS. 2A and 2B are further explanatory views showing the optical processing method of the present invention in which linear polarized light having a plane of polarization in the direction of the y axis is fed;

DETAILED DESCRIPTION OF PREFERRED EMBODIMENTS

Figure 1A:
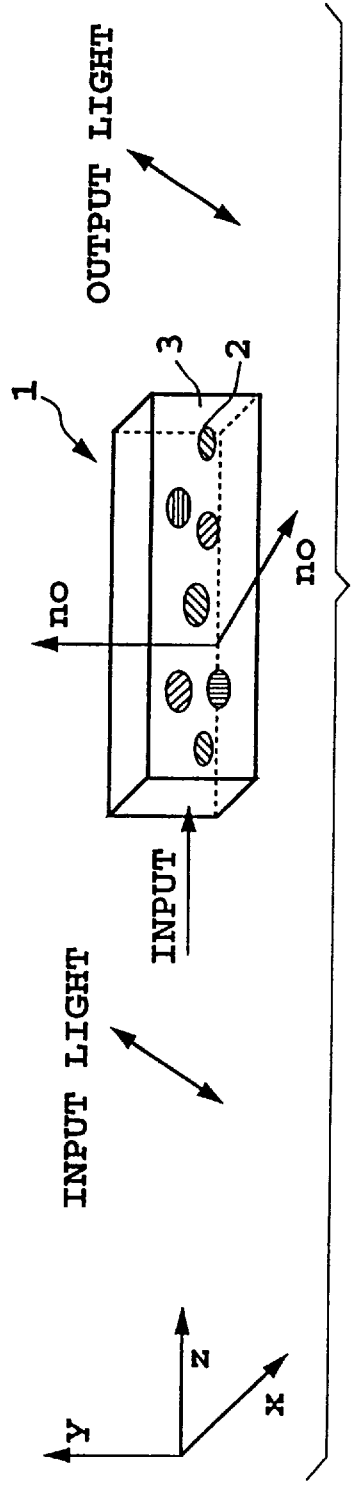
FIGS. 1A and 1B are explanatory views showing the optical processing method of the present invention in which linear polarized light having a plane of polarization inclined 45° from the x axis and the y axis is fed.

The gist of the present invention is to use a medium formed by making fine droplets of liquid crystal with a very small size, and dispersing them in a highly light transmitting polymer or glass. By so doing, the problem of light transmitting properties is solved, and the refractive index of the medium changes according to changes in the orientation vector of the liquid crystal by application of voltage. Thus, the present invention can provide an optical processing method using a waveguide containing fine droplets of liquid crystal, and a waveguide type optical device preferred for this optical processing method.

An attempt to use a liquid crystal in the form of fine droplets has been energetically made with liquid crystal droplets having a size of the order of microns, which cause marked scattering (D. Coates, Merck Liquid Crystals version 2, 5 (1994); J. L. West, Mol. Crystal. Liq. Cryst. Nonlin. Opt., 157, 427 (1988); and A. M. Lackner, J. D. Margerum, E. Ramos, and K. C. Lim, Proc. SPIE, Vol 1080, 53 (1989)). This is an application as a display device utilizing this scattering, and entirely differs from an application as a liquid crystal device for optical processing in optical communication as the present invention is aimed at. The liquid crystal dispersed optical device that the invention is directed to has a dispersion of fine droplets of a liquid crystal having droplet diameters of about one digit smaller (that is, about an order of magnitude smaller) than the wavelength of light for communication, and more particularly, a dispersion of fine droplets of the liquid crystal having droplet diameters of 150 nm or less. A liquid crystal dispersion having such a structure has been unknown, and its applications have not been considered.

The type of the liquid crystal used in the present invention may be any type, such as nematic, cholesteric or ferroelectric, as long as the liquid crystal's orientation changes upon application of voltage. A nematic liquid crystal which exhibits high refractive index anisotropy when its orientation changes is particularly desirable. The diameters of the fine droplets are about one digit smaller than 1 $\mu$m, the wavelength used in the fields of optical information processing and optical communication. Concretely, the diameters should be 150 nm or less, and preferably, 50 nm or less. If the diameters are larger than 150 nm, scattering due to differences in refractive index between the liquid crystal droplets and the medium is marked, and optical transmittance is not sufficient. When the diameters are 50 nm or less, the scattering loss is extremely small, even if the droplet density is high. At a smaller liquid crystal size, higher voltage tends to be required for driving the liquid crystal. Thus, the size of the liquid crystal droplets is preferably several nanometers or more.

The size of the liquid crystal fine droplets will be reviewed here. As will be seen in Embodiments 2 to 4, when light of 800 nm is used, a droplet diameter of less than 100 nm always results in a curtailed decrease in transmittance due to scattering.

As described in W. Heller, Light Scattering from Dilute Polymer Solutions, edited by D. Mcintyre and F. Gornick, (Gordon and Breach Science Publishers, Inc., 1964), p. 41, in the Rayleigh scattering region where the size of the source of scattering is smaller than a fraction of the wavelength of light, the transmittance of a medium with thickness L containing spherical scatterers of volume V (number density N) is expressed by the formula (1) to follow. Thus, the scattering loss is proportional to the second power of the volume (the sixth power of the droplet diameter), and is inversely proportional to the fourth power of the wavelength of light.

$$T=I_0 \exp(-NRL), R=24\pi^3((m^2-1)/(m^2+2))^2 V^2/\lambda^4 \quad (1)$$

where $I_0$ denotes the intensity of input light, and m denotes the refractive index of the scatterer divided by the refractive index of the medium.

Thus, in terms of the magnitude of scattering, a droplet diameter of 100 nm or less at a wavelength of 800 nm corresponds to a droplet diameter of 138 nm or less at a wavelength of 1.3 $\mu$m used in the fields of optical information processing and optical communication, and 152 nm in the 1.5 $\mu$m zone. Accordingly, the droplet diameter should be about a tenth of the wavelength or less.

The diameters of the liquid crystal droplets are preferably 50 nm or less (for a wavelength of 1.3 $\mu$m; 55 nm for a wavelength of 1.5 $\mu$m). As will be described, the production of a practical optical device requires a great magnitude of change in the refractive index of the light transmitting medium. For this purpose, the number density of the liquid crystal fine droplet should be high. If the number density of liquid crystal fine droplets measuring 50 nm or more (for a wavelength of 1.3 $\mu$) is high, however, the scattering loss will grow, and a practical device sometimes cannot be constructed.

At a smaller liquid crystal size, higher voltage tends to be required for driving the liquid crystal. Thus, the size of the liquid crystal droplets is preferably several nanometers or more.

The matrix medium where the fine droplets of the liquid crystal are dispersed may be a light transmitting material. Examples are highly light transmitting, optically isotropic polymers, such as PMMA's, polystyrenes, polycarbonates, thermopolymerization or photopolymerization acrylic polymers, epoxy polymers, polyurethanes, polyisocyanates, and glass.

A customary method for producing the liquid crystal dispersed polymer is by phase separation. For example, the matrix polymer and the liquid crystal are dissolved in an organic solvent, and the solvent is removed to separate droplets of the liquid crystal from the matrix polymer. Alternatively, the liquid crystal is dissolved in a thermopolymerization or photopolymerization prepolymer, and heat or light is applied to separate the liquid crystal droplets from the hardened matrix polymer. With either method, phase separation should be performed rapidly by rapid removal of the solvent or rapid setting of the prepolymer in order to obtain the liquid crystal fine droplets having the size defined in the present invention.

The liquid crystal dispersed medium in which the matrix is glass can be prepared by dipping porous glass in the liquid crystal, the porous glass having a pore diameter corresponding to the size of the liquid crystal fine droplets defined in the present invention.

The principle of the fine optical processing method using fine liquid crystal droplets of the present invention, and the principle of operation of a waveguide type optical device for optical processing in accordance with the invention will be described by reference to FIGS. 1A and 1B and FIGS. 2A and 2B.

In FIGS. 1A and 1B and FIGS. 2A and 2B, a light transmitting medium 1 contains liquid crystal fine droplets 2 dispersed in a light transmitting material 3. When no voltage is applied (FIGS. 1A and 2A), the directors of the dispersed liquid crystal fine droplets 2 head in random directions. Thus, the light transmitting medium as a whole has no anisotropy in its refractive index. Its refractive index is the same in every direction, and takes the average ($n_0$) of the refractive indices of the light transmitting material of the matrix and those of the liquid crystal.

Figure 1B:
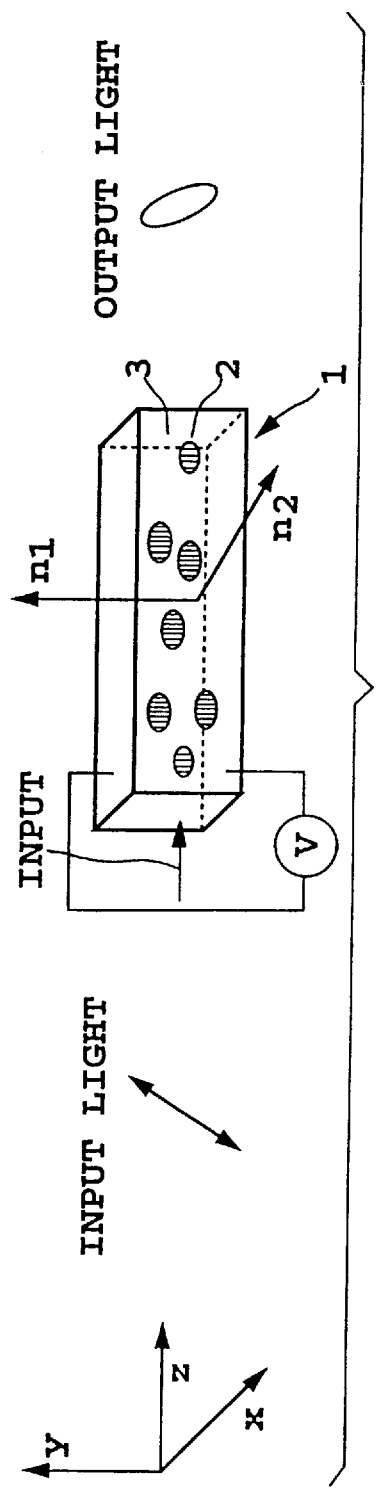

When voltage is applied in the direction of the y axis in FIG. 1B, the directors of the liquid crystal fine droplets 2 are oriented in a specific direction rather than random directions, because of the anisotropy of dielectric constant or ferroelectricity that the liquid crystal itself has. Owing to this orientation, anisotropy of the refractive index (refractive index in the x axis direction: $n_2$, refractive index in the y axis direction: $n_1$) occurs in a plane parallel to the direction of voltage application (the xy plane). For instance, the refractive index anisotropy of a nematic liquid crystal, $\Delta n$, is about 0.25; however, when this liquid crystal is dispersed in the medium at a volume ratio of 10%, the refractive index anisotropy caused by application of voltage, ($\Delta n = n_2 - n_1$ or $\Delta n = n_1 - n_2$), can be estimated at $\Delta n =$ about 0.025. The change in the refractive index in the y-axis direction (or the x-axis direction) due to application of voltage, ($n_1 - n_0$), can be estimated at about a half of the above value. The same is true for the change in the refractive index in the x-axis direction, ($n_2 - n_0$). As will be noted from this, the magnitude of the refractive index anisotropy caused by application of voltage, and the magnitude of the change in refractive index in the x- or y-axis direction by application of voltage, are considerable.

The sizes of the liquid crystal fine droplets are sufficiently small compared with the wavelength, so that the optical transmittance is large and the optical loss is small.

Now, linear polarized light having a plane of polarization inclined 45° from each of the x and y axes is fed in the z-axis direction, as shown in FIGS. 1A and 1B. In the absence of an applied voltage (FIG. 1A), there is no refractive index anisotropy in the xy plane, and thus the linear polarized light is kept as such. In the presence of an applied voltage (FIG. 1B), refractive index anisotropy occurs in the xy plane, so that the linear polarized light is not kept, but is issued as elliptically polarized light. Thus, the application of voltage makes processing of light possible. Furthermore, a polarizer (analyzer) which does not pass polarized light heading in the same direction as the input light can be placed on the output light side, whereby an optical switch action becomes possible. That is, when no voltage is applied, a state of small transmittance (OFF state) is achieved, whereas when voltage is applied, a state of large transmittance (ON state) is achieved. If a $\lambda/4$ plate is placed ahead of the analyzer to convert elliptically polarized light into linearly polarized light, a more efficient switch action can be performed.

Moreover, when light with a plurality of wavelengths is used as input light, and an analyzer is placed on the output light side, the angle of rotation of the analyzer when maximum transmitted light is obtained differs according to wavelength. If the angle of rotation of the analyzer is constant, the applied voltage when maximum transmitted light is obtained differs according to wavelength. Thus, signals with a plurality of wavelengths can be separated. In this case, too, efficient separation can be performed by jointly using a $\lambda/4$ plate.

Optical processing and optical switch action when voltage is not applied, and when voltage is applied in the y-axis direction, have been explained above. It goes without saying that when voltage is applied in the x-axis direction and in the y-axis direction, optical processing and optical switch action will be achieved likewise.

In FIGS. 2A and 2B, linearly polarized light having a plane of polarization in the direction of the y axis, parallel to the direction of voltage application, is fed in the z-axis direction. In this case, the linearly polarized light is kept whether voltage is applied or not. However, the refractive index in the y-axis direction is $n_0$ in the absence of voltage, and $n_1$ in the presence of voltage. Thus, it generates a phase difference in the output light.

Figure 3:
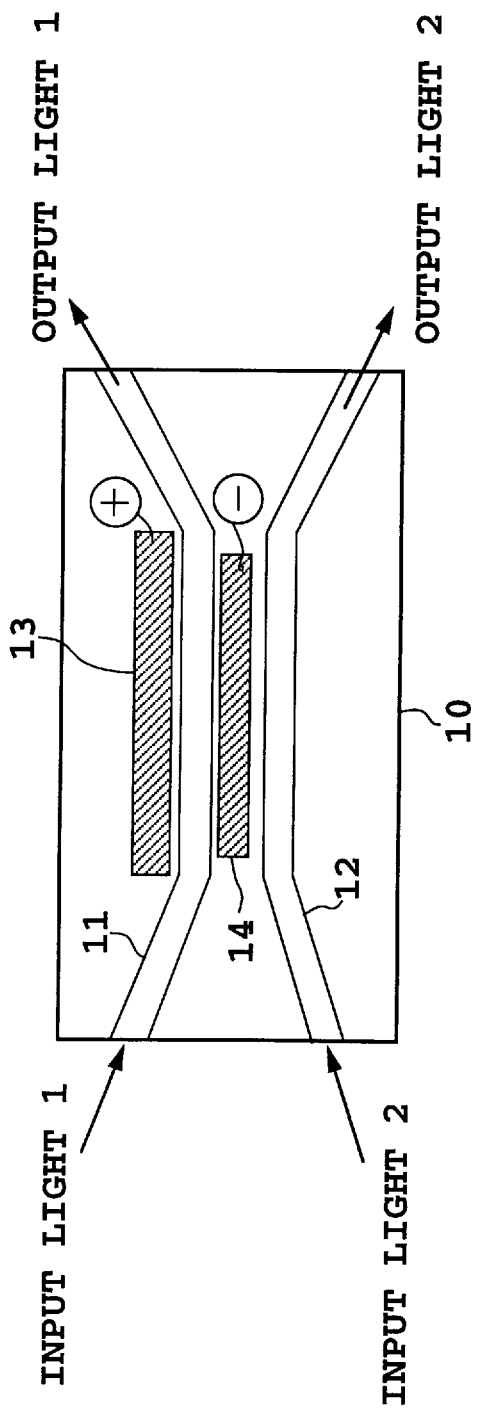
FIG. 3 is a schematic plan view showing an example of the structure of the optical device according to the present invention.

FIG. 3 shows the optical device of the present invention constructed as an optical switch. In FIG. 3, the numeral 10 denotes a substrate, 11, 12 are optical waveguides, and 13, 14 are electrodes. The illustrated device has a structure in which the two optical waveguides 11, 12 comprising the light transmitting medium having the liquid crystal fine droplets 2 dispersed therein are disposed close to each other on the substrate 10, and the electrodes 13, 14 are disposed parallel to each other with the optical waveguide 11 sandwiched therebetween so that voltage can be applied to the optical waveguide 11. This device can be prepared, by, say, spreading a mixture of the liquid crystal and the matrix prepolymer onto the substrate according to the pattern of the optical waveguides; irradiating the mixture with UV light mixture to separate the liquid crystal fine droplets from the matrix polymer, thereby forming the optical waveguides comprising the light transmitting medium having the liquid crystal fine droplets dispersed therein; and forming the electrodes so as to sandwich one optical waveguide, by means, such as coating the electrode material onto the substrate 10. Linearly polarized light having a plane of polarization in the direction of the substrate surface is entered as input lights 1, 2 into the optical waveguides 11, 12. Upon application of voltage, the refractive index of the optical waveguide 11 changes from $n_0$ to $n_1$, while the refractive index of the optical waveguide 12 remains $n_0$. Thus, the coupling ratio changes, achieving an optical switch.

Several embodiments of the present invention will be described below; they are provided for illustration only, and in no way limit the present invention.

Embodiment 1

A liquid crystal dispersed polymer was prepared from a commercially available photopolymerization polymer (NOA65, Norland Products Inc., U.S.A.) and a commercially available nematic liquid crystal (BL24, Merck Industrial Chemicals). The procedure for preparation was as follows: The liquid crystal in a predetermined amount was dissolved completely in the photopolymerization prepolymer, and cast into a film-shaped mold, followed by irradiation with a strong alkali halide lamp for 5 minutes. The resulting films (0.5 mm thick) were measured for optical transmittance at a wavelength of 1.3 $\mu$m. At a liquid crystal concentration (the proportion of the liquid crystal to the polymer) of up to 30%, there was no decrease in light transmittance. At a liquid crystal concentration of 40% or more, the light transmittance declined to about 30%. Sectional SEM images of the produced films showed no liquid crystal fine droplets at a liquid crystal concentration of up to 30%. At a liquid crystal concentration of 40% or more, the size of the liquid crystal fine droplets was about 0.4 $\mu$m. In the range of 32% to 36%, liquid crystal fine droplets measuring 150 nm or less were observed. Linearly polarized light was fed to the films with a liquid crystal concentration of 32% to 36%, and the state of polarization of light transmitted through the films was examined. The linearly polarized light was found to be maintained.

Then, the polymer containing a dispersion of the liquid crystal fine droplets measuring 150 nm or less was disposed as shown in FIG. 1 (the size of the polymer: 1 mm along the x axis×1 mm along the y axis×2 mm along the z axis). Linearly polarized light, having a plane of polarization inclined 45° from each of the x and y axes, was fed from the direction of the z axis. When no voltage was applied, linearly polarized light was maintained. When a voltage, say, of several hundred V, was applied in the direction of the y axis, the state of polarization of output light changed. A polarizer (analyzer) allowing no passage of polarized light heading in the same direction as the input light was further placed on the output light side, whereby an optical switch action became possible upon application of the voltage (several hundred V to 1 KV). That is, when no voltage was applied, a state of small transmittance (OFF state) was achieved, whereas when voltage was applied, a state of large transmittance (ON state) was achieved.

Embodiment 2

Then, commercially available porous glass (average pore diameter: 10 nm) was cut to a size of 10 mm×1 mm×1 mm, and dipped in a nematic liquid crystal (BL24, Merck) for several hours at room temperature. Because of penetration of the liquid crystal into the pores, the total volume increased by about 3%. A decrease in transmittance attributable to this increase was 1 to 2%. The glass impregnated with the liquid crystal was disposed as shown in FIGS. 1A and 1B (10 mm along the x axis×1 mm along the y axis×1 mm along the z axis). Linearly polarized light, having a plane of polarization inclined 45° from each of the x and y axes, was fed from the direction of the z axis. When no voltage was applied, linearly polarized light was maintained. When voltage was applied in the direction of the y axis, it was confirmed that the state of polarization of output light changed upon application of a voltage of 100 V. A polarizer (analyzer) allowing no passage of polarized light heading in the same direction as input light was further placed on the output light side, whereby an optical switch action became possible upon application of the voltage (100 V to 500 V). That is, when no voltage was applied, a state of small transmittance (OFF state) was achieved, whereas when voltage was applied, a state of large transmittance (ON state) was achieved. The larger the voltage, the higher the extinction ratio.

Embodiment 3

Merck's BL24 as in Embodiment 1 was used as a nematic liquid crystal, and a photopolymerization polymer (NOA81, Norland) having a higher polymerization rate than in Embodiment 1 was used as a liquid crystal dispersed polymer. Films 0.5 mm thick were prepared by the same procedure as in Embodiment 1, and measured for transmittance. Using their SEM images, the films were also evaluated for the size and density of the liquid crystal fine droplets. At a liquid crystal concentration of up to 26%, there was a little decrease in transmittance at 800 nm. At a liquid crystal concentration of 28% or more, the transmittance declined greatly. At a liquid crystal concentration of 16% or more, liquid crystal fine droplets were observed, and their sizes were 35 to 70 nm at the concentration of 16%. Their sizes did not depend on the concentration, and were 100 nm or less even at 30%.

Then, the above prepolymer and the nematic liquid crystal were mixed and dissolved (mixing ratio: 100/20). The solution was spin coated on a 540 μm silicon substrate to a thickness of about 20 μm. At this stage, the coating was irradiated with a strong metal halide lamp for 5 minutes to form the liquid crystal fine droplets in the polymer. A gold film 0.1 μm thick was deposited on the liquid crystal fine droplets dispersed polymer, and finally cut to a size of 1 mm×10 mm for use as a sample for optical experiments. The resulting liquid crystal fine droplets had an average diameter of about 50 nm, and a total volume fraction of 1%.

Figure 4:
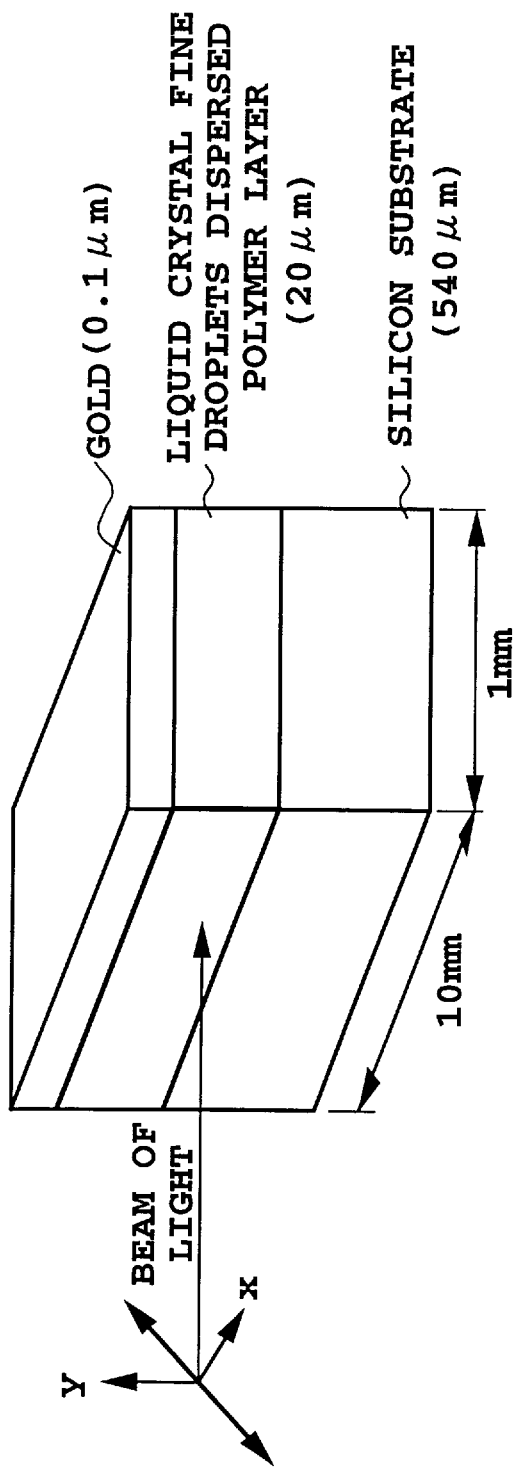
FIG. 4 is a schematic perspective view showing the state of feeding of light into the optical device according to the third embodiment of the present invention.
Figure 5:
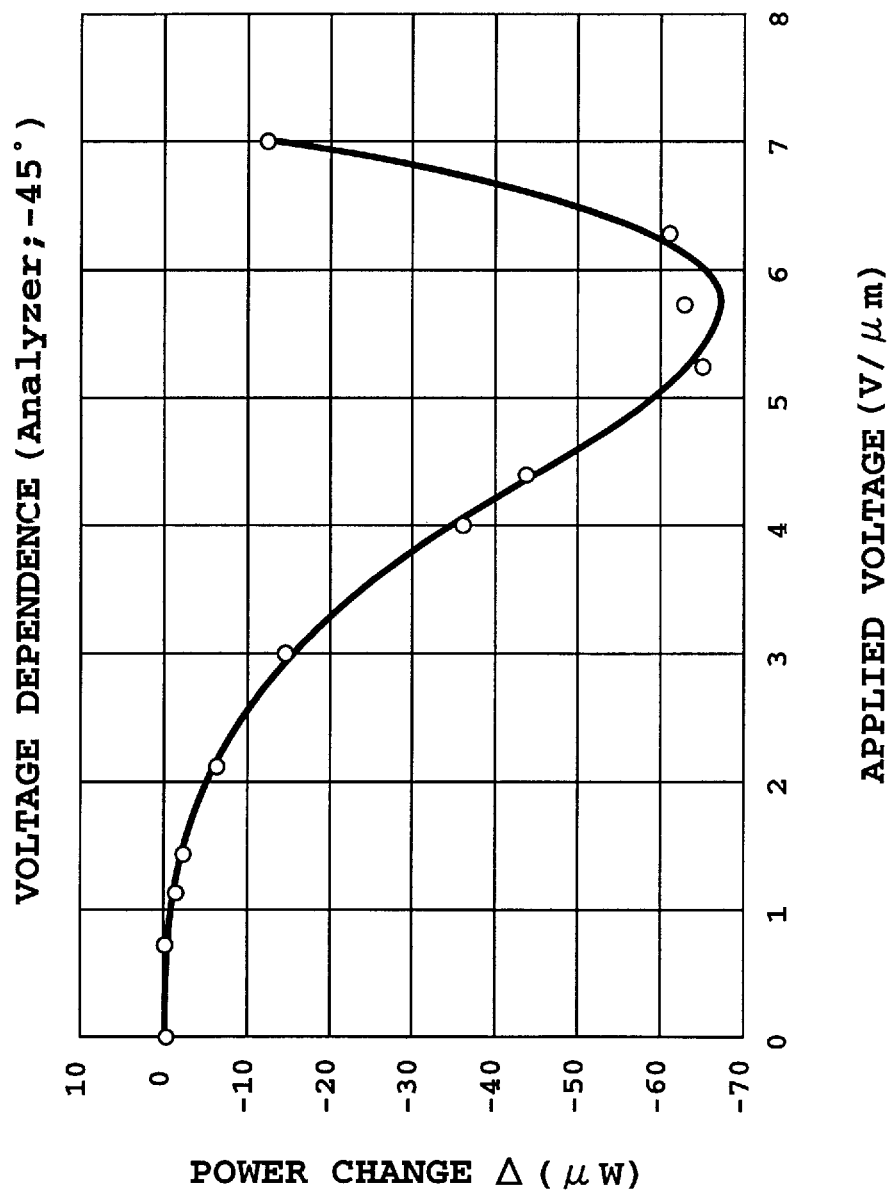
FIG. 5 is a graph of power changes plotted against the applied voltage (analyzer used: −45°), as a view illustrating the third embodiment of the present invention.

A narrow-radius beam of linearly polarized light was fed perpendicularly to a section of the liquid crystal fine droplets dispersed polymer film sample, the linearly polarized light having a plane of polarization inclined at 45° with respect to the direction of the film surface. This is illustrated in FIG. 4. Output light from the other end face was guided to a power meter through an analyzer pointing in the direction of −45°. A pulse voltage of a predetermined square waveform (100 msec) was applied between the silicon substrate and the deposited gold film to observe changes in the power. The results of observation are shown in FIG. 5. When no voltage was applied, output light already showed elliptically polarized light with retardation of about 120 degrees. This is because the polymer film shows birefringence with a large refractive index in the direction of the film surface and a small refractive index in the direction of the film thickness. With the application of voltage, the liquid crystal responds, causing changes such that the refractive index in the direction of film thickness gradually increases, and the retardation decreases. These changes are observed as the changes in power. After application of about 5 V/μm, the power increases or decreases were reversed. At the time of this reversal, the retardation was 0, representing the state of practically linearly polarized light.

Figure 6:
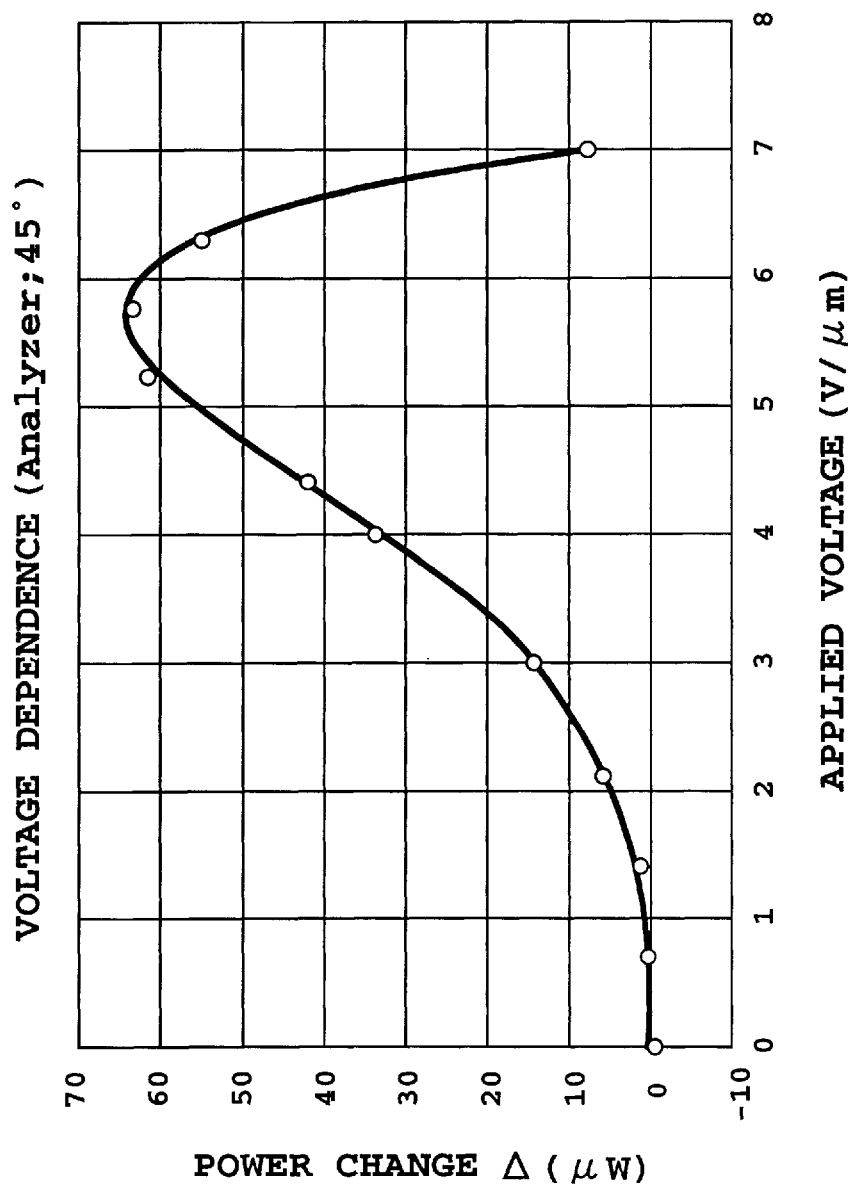
FIG. 6 is a graph of power changes plotted against the applied voltage (analyzer used: +45°), as a view illustrating the third embodiment of the present invention.

Conversely, power changes were observed through a +45° analyzer, as shown in FIG. 6. This drawing indicates nearly symmetrical changes compared with FIG. 5. This fact demonstrates that these power changes were attributed to changes in polarization owing to increases or decreases in birefringence induced by the liquid crystal fine droplets, and not that they reflect changes in the state of transmission and the state of scattering due to the response of liquid crystal, as observed with a conventional liquid crystal dispersed polymer. Such changes in polarization were achieved for the first time with the liquid crystal fine droplets almost free from scattering.

The change in the refractive index (change in birefringence, to be more exact) when about 5 V/μm was applied was about 0.0004. This magnitude is nearly equal to the magnitude of change in refractive index calculated from the nonlinear optical coefficient of lithium niobate. This means that the material and optical processing method of the present invention are sufficiently practical.

To increase the change in refractive index and enhance the practicability further, it is recommendable to make the volume ratio of the liquid crystal fine droplets high. The volume ratio of the liquid crystal fine droplets of the sample used here is still 1%. To make the volume ratio higher is not difficult in terms of the method for production. A higher volume ratio would enable the material of the present invention to surpass even lithium niobate. An increased volume ratio, however, would lead to increased scattering. As was shown previously in the formula (1), scattering is proportional to the number of the scattering media, and is proportional to the second power of the volume of one of the scatterers. Thus, the entire volume fraction can be increased without increasing scattering, by making the number of the scatterers larger while making the diameters of the scattering media smaller. As was explained above, the diameters of the liquid crystal fine droplets are desirably 50 nm or less (for a wavelength of 1.3 μm) in order to enhance practicability.

Embodiment 4

Merck's BL4 (having lower solubility than the liquid crystal in Embodiment 1) was used as a nematic liquid crystal, and a photopolymerization polymer (NOA81, Norland, U.S.A.) was used as a liquid crystal dispersed polymer. Films 0.5 mm thick were prepared by the same procedure as in Embodiment 1, and measured for transmittance. Using their SEM images, the films were evaluated for the size and density of the liquid crystal fine droplets. At a liquid crystal concentration of up to 13%, there was a little decrease in transmittance at 800 nm. At a liquid crystal concentration of 15% or more, the transmittance declined greatly. At a liquid crystal concentration of 11% or more, liquid crystal fine droplets were observed, and their sizes were 40 to 70 nm at the concentration of 13%.

Then, the above prepolymer and the nematic liquid crystal were mixed and dissolved (mixing ratio: 100/16). The resulting sample, of the same shape as in Embodiment 3, was measured for power changes associated with applied voltage. As in Embodiment 3, polarized light was confirmed to change according to increases or decreases in birefringence due to the response of the liquid crystal fine droplets.

Embodiment 5

Merck's BL24 as in Embodiment 1 was used as a nematic liquid crystal, and a photopolymerization polymer (NOA61, Norland, U.S.A.) having greater mechanical strength than the polymer in Embodiment 1 was used as a liquid crystal dispersing polymer. Films 0.5 mm thick were prepared by the same procedure as in Embodiment 1, and measured for transmittance at 800 mm. Using their SEM images, these films were evaluated for the size and density of the liquid crystal fine droplets. At a liquid crystal concentration of up to 17%, there was a little decrease in transmittance. At a liquid crystal concentration of 18% or more, the transmittance declined greatly. At a liquid crystal concentration of 12% or more, liquid crystal fine droplets were observed, and their sizes were 40 to 80 nm at the concentration of 13%.

Then, the above prepolymer and the nematic liquid crystal were mixed and dissolved (mixing ratio: 100/13). The resulting sample, of the same shape as in Embodiment 3, was measured for power changes associated with applied voltage. As in Embodiment 3, polarized light was confirmed to change according to increases or decreases in birefringence due to the response of the liquid crystal fine droplets.

Embodiment 6

Figure 7:
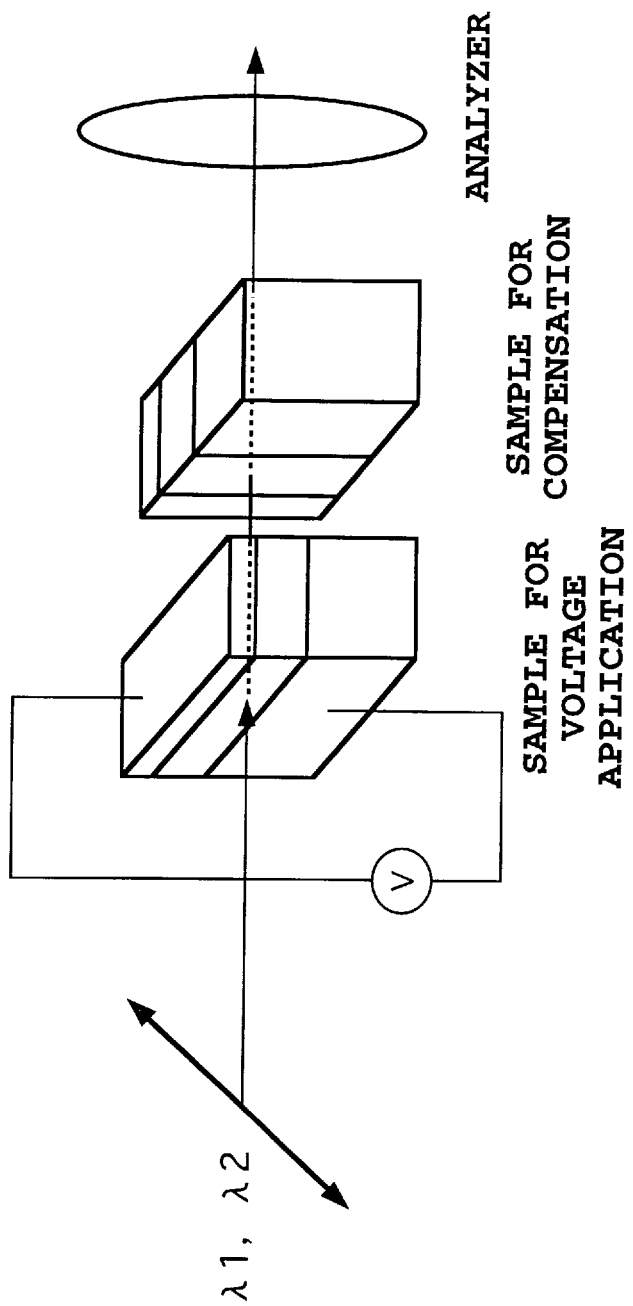
FIG. 7 is a schematic perspective view showing the state of feeding of light into the optical device according to the sixth embodiment of the present invention.

Two samples, each being the same as shown in Embodiment 3 and FIG. 4, and having a 1.5 mm optical path, were disposed at an angle of 90° with respect to each other as shown in FIG. 7. One of the samples was the sample for application of voltage, and the other sample was one for making up for birefringence that the sample had in itself. Thus, when no voltage was applied, output light in the same state of polarization as that of the input light was obtained. To this sample, semiconductor laser light with a wavelength of 1.3 $\mu$m and helium neon laser light with a wavelength of 633 nm were simultaneously fed, each as linearly polarized light whose plane of polarization made an angle of 45° with the direction of the film surface. A voltage of 5 V/$\mu$m was applied, and output light obtained when the analyzer was placed parallel to the plane of polarization of the input light was passed through a monochromator. Only light of nearly 633 nm was found to be transmitted. The output light when the analyzer was placed perpendicularly to the plane of polarization of the input light, with the voltage being unchanged, was found to be only light of nearly 1.3 $\mu$m. This means that light of two wavelengths was separated by suitably selecting the optical path, the applied voltage and the angle of the analyzer.

As described above, practical waveguide type optical devices using liquid crystals have not been developed, because of light scattering due to the inherent nature of liquid crystals. The present invention, by contrast, was able to reduce optical scattering by converting a liquid crystal into fine droplets with very small diameters of one digit smaller than the wavelength of light for communication, and more particularly, diameters of 150 nm or less, and dispersing these droplets in a highly light transmitting polymer or glass. By applying voltage to this medium, and utilizing the resulting refractive index anisotropy, a practicable optical processing method and an optical device relying on this method were realized. The optical processing method and the waveguide type optical device effectively use the magnitude of change in the refractive index of liquid crystal, and have the advantage of a low voltage driving. They are highly practical compared with conventional optical processing methods and liquid crystal optical devices.

The present invention has been described in detail with respect to preferred embodiments, and it will now be clear that changes and modifications may be made without departing from the invention in its broader aspects, and it is our intention, therefore, in the appended claims to cover all such changes and modifications as fall within the true spirit of the invention.

What is claimed is:

1. A waveguide type optical device for processing a beam of light comprising:

an elongated body of a light transmitting medium having fine droplets of liquid crystal dispersed therein, the droplets having droplet diameters that are smaller than about 150 nm, the body having first and second sides and entry and exit end faces that extend between the first and second sides, the beam of light entering the body through the entry end face and exiting the body through the exit end face after traveling through the body along a path between the entry and exit end faces; and means for establishing an electric field between the first and second sides of the body.

2. The waveguide type optical device of claim 1, wherein the first and second sides of the body are substantially parallel and are spaced apart by a distance of at least about 20 $\mu$m.

3. The waveguide type optical device of claim 2, wherein the first and second sides are spaced apart by at least about half of a millimeter.

4. The waveguide type optical device of claim 3, wherein the first and second sides are spaced apart by at least about a millimeter.

5. The waveguide type optical device of claim 1, wherein the first and second sides of the body are substantially parallel and the entry end face is substantially perpendicular to the first and second sides.

6. The waveguide type optical device of claim 1, wherein the entry and exit end faces of the body are spaced apart by a distance of at least about a millimeter.

7. The waveguide type optical device of claim 1, wherein the body comprises porous glass that has been soaked in liquid crystal.

8. The waveguide type optical device of claim 1, wherein the path between the entry and exit end faces of the body is a linear path that is disposed along a straight line between the entry and exit end faces.

9. The waveguide type optical device of claim 1, wherein the body is a first body, and further comprising a substrate which supports the first body, and a second elongated body of a light transmitting medium having fine droplets of liquid crystal dispersed therein, the droplets in the second body having droplet diameters that ate smaller than about 150 nm, the second body being supported on the substrate adjacent the first body, and wherein the means for establishing an electric field comprises a first electrode on the substrate adjacent the first side of the first body and a second electrode on the substrate adjacent the second side of the first body, the second electrode being disposed between the first and second bodies.

* * * * *